United States Patent [19]
Osten

[11] Patent Number: 5,948,075
[45] Date of Patent: Sep. 7, 1999

[54] SYSTEM FOR IDENTIFYING OPERATING PARAMETERS IN A STORAGE ENCLOSURE HAVING EACH OF FIRST CONNECTOR ONLY FOR SPECIFYING A PHYSICAL LOCATION ASSOCIATED WITH EACH OF BACKPLANE INTERFACES

[75] Inventor: Thomas James Osten, Rochester, Minn.

[73] Assignee: International Business Machines Corporation, Armonk, N.Y.

[21] Appl. No.: 08/868,692

[22] Filed: Jun. 4, 1997

[51] Int. Cl.$^6$ ........................................ G06F 13/10
[52] U.S. Cl. ................... 710/8; 710/15; 710/74; 711/114; 714/22
[58] Field of Search .................... 395/828, 894; 710/8, 15, 74; 711/114; 714/22

[56] References Cited

U.S. PATENT DOCUMENTS

| | | | |
|---|---|---|---|
| 5,337,413 | 8/1994 | Lui et al. ................................ | 395/822 |
| 5,379,184 | 1/1995 | Barraza et al. ......................... | 361/685 |
| 5,586,291 | 12/1996 | Lasker et al. .......................... | 711/113 |
| 5,666,557 | 9/1997 | Cassidy et al. ........................ | 395/828 |
| 5,731,951 | 3/1998 | Michaud et al. ....................... | 361/681 |
| 5,748,874 | 5/1998 | Hicksted et al. ................... | 395/182.22 |
| 5,768,623 | 6/1998 | Judd et al. ............................. | 395/857 |
| 5,812,754 | 9/1998 | Lui et al. ........................... | 395/182.04 |

*Primary Examiner*—Thomas C. Lee
*Assistant Examiner*—Ilwoo Park
*Attorney, Agent, or Firm*—Andrew J. Dillon; Lisa B. Yociss; Matthew J. Bussan

[57] ABSTRACT

An interface in a data-processing system for identifying operating parameters of storage systems and enclosures is disclosed. The data-processing system communicates with the storage systems utilizing a serial bus. The storage systems are included within a storage system enclosure which includes a backplane. A backplane interface is included within the backplane and is utilized for coupling a storage system to the storage system enclosure. The storage system has a first and a second connector which are coupled together. The second connector is coupled to the backplane interface and is utilized to transmit data to be stored to and read from the storage system. A plurality of resistors are coupled to the first connector. A physical location is selected for a storage system by connecting selected ones of the resistors to a first potential, while all remaining resistors are connected to a second potential.

13 Claims, 4 Drawing Sheets

SYSTEM FOR IDENTIFYING OPERATING PARAMETERS IN A STORAGE ENCLOSURE HAVING EACH OF FIRST CONNECTOR ONLY FOR SPECIFYING A PHYSICAL LOCATION ASSOCIATED WITH EACH OF BACKPLANE INTERFACES

BACKGROUND

1. Technical Field

The present invention relates to data-processing systems and, in particular, to an interface in a data-processing system for identifying operating parameters of storage systems and storage system enclosures. Still more particularly, the depicted illustrative embodiment relates to an interface in a data-processing system for identifying operating parameters of storage systems and enclosure elements included within a storage system enclosure, wherein the storage systems are coupled to the data-processing system utilizing a serial bus.

2. Description of the Related Art

In many data-processing systems, it becomes necessary to connect a plurality of peripheral devices to the data-processing system. Such peripheral devices may include storage systems such as direct access storage devices, tape drives, CD-ROM drives, communication devices, and other devices. These devices are typically identified within a particular software program by a logical address. The logical address of a particular peripheral device is the address used by software when transferring data to and from the particular peripheral device. The logical address of a peripheral device does not indicate the physical location of that device.

A physical location of a particular peripheral device must be determined when the device requires maintenance. For example, if a power system element or fan element failed for a particular device, the physical location must be determined in order to make the necessary repairs.

Storage systems may be coupled to data-processing systems utilizing a variety of communication protocols or standards. One such standard is the small computer system interface, or SCSI.

The SCSI standard defines a particular command set. The SCSI may be implemented utilizing either a parallel bus or a serial bus. In a parallel bus implementation, each device is connected to one or more of the physical wires of the parallel bus in a multidrop line manner. Each device receives data on the bus simultaneously.

The SCSI standard may also be implemented utilizing a serial bus protocol. Currently, there are two such serial protocols: serial storage architecture (SSA) and fiber channel arbitrated loop (FCAL). The serial bus includes one or more physical wires which are connected in a serial manner from one device to another. Each device receives data serially, one bit at a time, where a device received data after the previous device in the serial loop has received the data in a point-to-point manner.

Therefore, a need exists for a method and system to identify operating parameters which include a physical location of storage systems within a data-processing system.

SUMMARY OF THE INVENTION

It is therefore one object of the present invention to provide an improved data-processing system.

It is another object of the present invention to provide an interface in a data-processing system for identifying operating parameters of storage systems and other elements within a storage system enclosure.

It is yet another object of the present invention to provide an interface in a data-processing system for identifying operating parameters of storage systems included within a storage system enclosure, wherein the storage systems are coupled to the data-processing system utilizing a serial bus.

The foregoing objects are achieved as is now described. An interface in a data-processing system for identifying operating parameters of storage systems and enclosures is disclosed. The data-processing system communicates with the storage systems utilizing a serial bus. The storage systems are included within a storage system enclosure which includes a backplane. A backplane interface is included within the backplane and is utilized for coupling a storage system to the storage system enclosure. The storage system has a first and a second connector which are coupled together. The second connector is coupled to the backplane interface and is utilized to transmit data to be stored to and read from the storage system. A plurality of resistors are coupled to the first connector. A physical location is selected for a storage system by connecting selected ones of the resistors to a first potential, while all remaining resistors are connected to a second potential.

The above as well as additional objectives, features, and advantages of the illustrative embodiment will become apparent in the following detailed written description.

BRIEF DESCRIPTION OF THE DRAWINGS

The novel features are set forth in the appended claims. The illustrative embodiment itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF PREFERRED EMBODIMENT

An exemplary embodiment of the present invention and its advantages are better understood by referring to FIGS. 1–4 of the drawings, like numerals being used for like and corresponding parts of the accompanying drawings.

Figure 1:
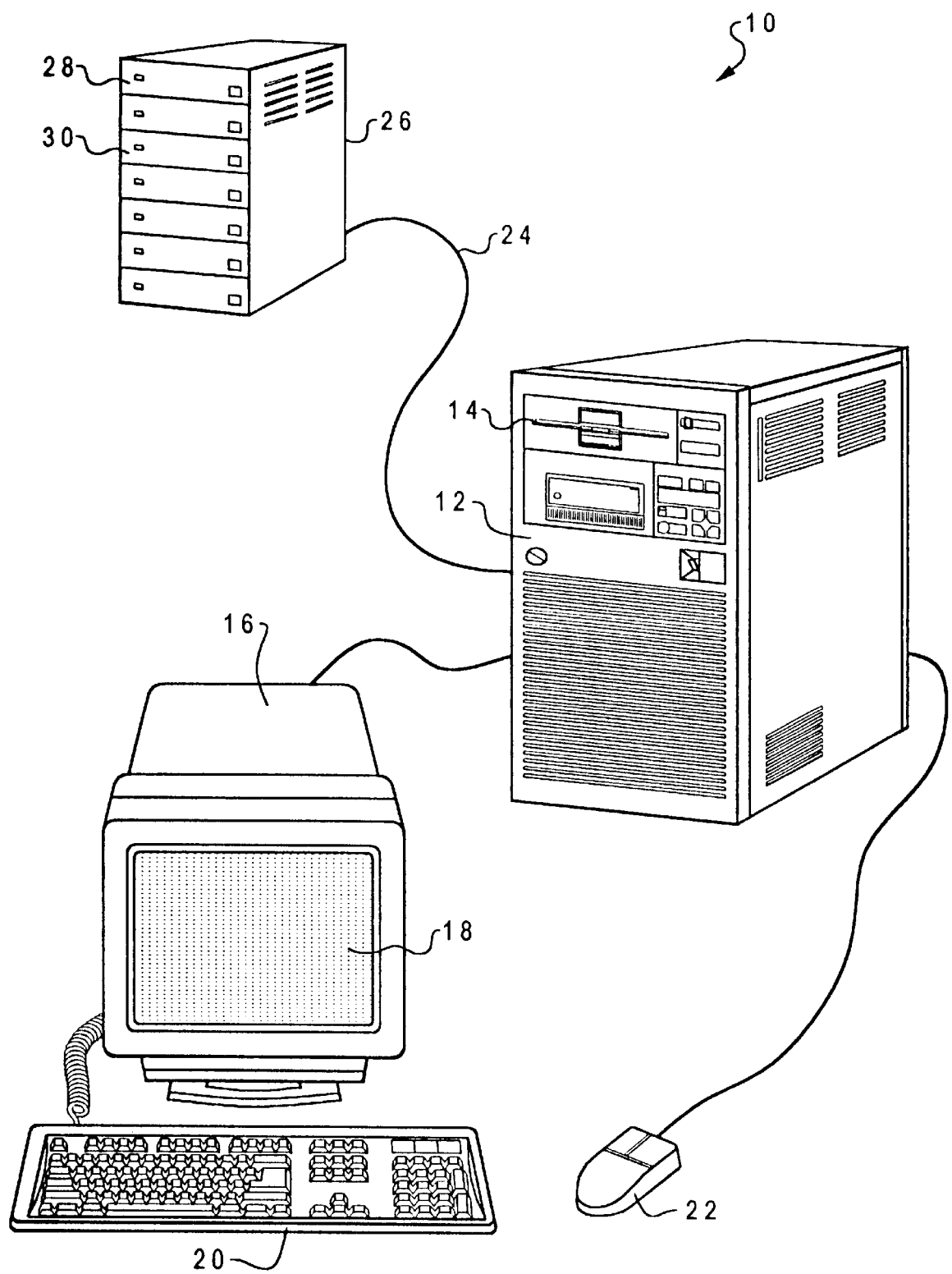
FIG. 1 depicts a pictorial representation of a data-processing system 10 which may be utilized to implement the method and system of the present invention.

With reference now to the figures and in particular with reference to FIG. 1, there is depicted a pictorial representation of a data-processing system 10 which may be utilized to implement the method and system of the present invention. In a preferred embodiment, data-processing system 10 may include a plurality of computers which may be connected together in a local area network. Of course, those skilled in the art will appreciate that a plurality of intelligent workstations coupled to a host processor may be utilized to implement such network. Data-processing system 10 is preferably implemented utilizing a data-processing system such as the IBM AS/400, available from International Business Machines Corporation. IBM AS/400 is a trademark of IBM Corporation.

As is common in such data-processing systems, data-processing system 10 includes a CPU 12 coupled to a storage device such as a floppy disk drive 141. Data-processing system 10 has associated therewith a computer display 16 which includes a display screen 18, a keyboard 20, and an input pointing device, such as a mouse 22.

One or more such storage devices may be utilized to store the various data objects or files which may be periodically accessed, processed, and presented within data-processing system 10 in accordance with the method and system of the present invention. In a manner well known in the prior art, each such data processing document or file may be stored within a storage device which may be associated with a resource manager or library service, which is responsible for maintaining and updating all resource objects associated therewith.

In a preferred embodiment, a storage system enclosure 26 is included to house a plurality of storage systems and is coupled to CPU 12 which may communicate with any of the plurality of storage systems. CPU 12 may select any of the storage systems included within storage system enclosure 26 to utilize to store and\or retrieve data. Storage system enclosure 26 includes at least one storage system, and typically includes a plurality of storage systems, such as storage systems 28 and 30. Storage systems 28 and 30 are each preferably implemented utilizing a direct access storage device (DASD) having a serial small computer system interface (serial SCSI). The serial SCSI interface may conform to either the SSA or FCAL protocol. In a preferred embodiment, a cable 24 is a serial SCSI cable which conforms to the SSA protocol and which couples CPU 12 to a storage system enclosure 26.

Figure 2:
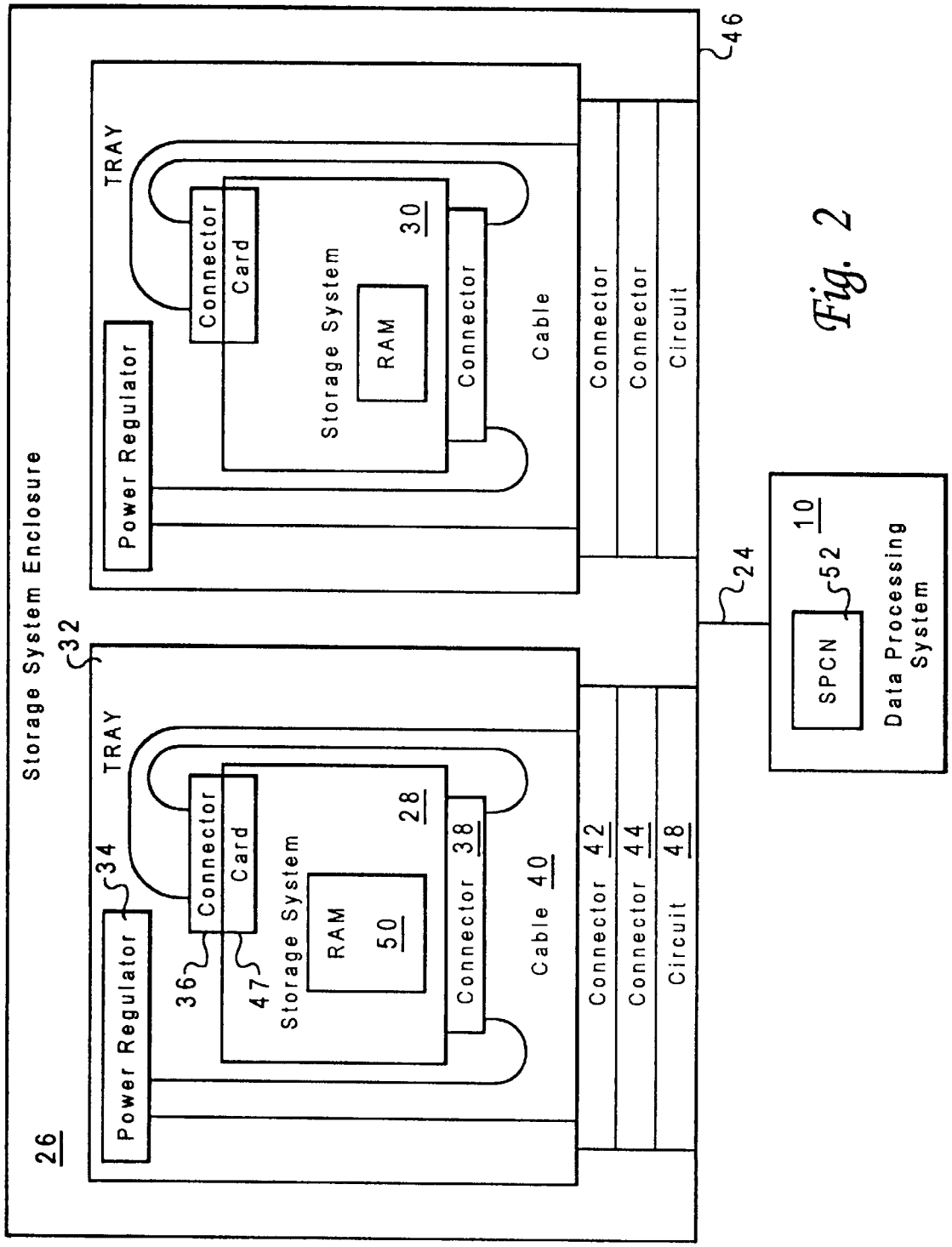
FIG. 2 illustrates a block diagram of storage system enclosure 26 including storage systems 28 and 30 coupled to storage system enclosure 26 in data-processing system 10 in accordance with the present invention.

FIG. 2 is a block diagram of storage system enclosure 26 including storage systems 28 and 30 coupled to storage system enclosure 26 in a data-processing system 10 in accordance with the present invention. Each storage system is supported in storage system enclosure 26 by a tray. Storage system 28 is supported in storage system enclosure 26 by tray 32. Tray 32 also holds power regulator 34 for storage system 28.

Storage system 28 includes a first connector 36 and a second connector 38. Second connector 38 is utilized to transmit storage data to\from storage system 28 and CPU 12. First connector 36, second connector 38, and power regulator 34 are coupled together utilizing cable 40. Cable 40 is also coupled to tray connector 42. Tray connector 42 is utilized to couple first connector 36, second connector 38, and power regulator 34 to backplane connector 44. Backplane connector 44 is included within and secured to the backplane 46 of storage system enclosure 26. Storage system enclosure 26 may include any number of backplane connectors necessary to couple a plurality of storage systems to enclosure 26.

Each storage system includes a plurality of resistors 54 preferably mounted on a circuit card 47. An Enable signal line 49 is included to indicate to storage system 28 that RAM 50 is to be accessed. Circuit card 47 communicates with first connector 36 so that plurality of resistors 54 may be accessed utilizing first connector 36. Backplane 46 includes a plurality of circuits which communicate with the backplane connectors. A backplane interface includes a particular backplane connector and a circuit card which communicates with the particular backplane connector. A circuit 48 is included within backplane 46 and communicates with backplane connector 44. Circuit 48 may be utilized to connect selected ones of the plurality of resistors to ground.

Each storage system also includes a memory, such as RAM 50. RAM 50 may be utilized to store operating parameters which include a physical address for the storage system, information regarding the storage system's and/or storage system enclosure's power supply, fan, or any other information regarding the storage system's or enclosure's operation.

Data-processing system 10 includes a system power control network 52 which is capable of communicating with the host operating system and turning selected storage systems off and on. The system power control network regulates fan control, detects fan faults, detects regulator failures, and detects power supply failures for power elements, cooling elements, and device elements within the storage system enclosure.

Figure 3:
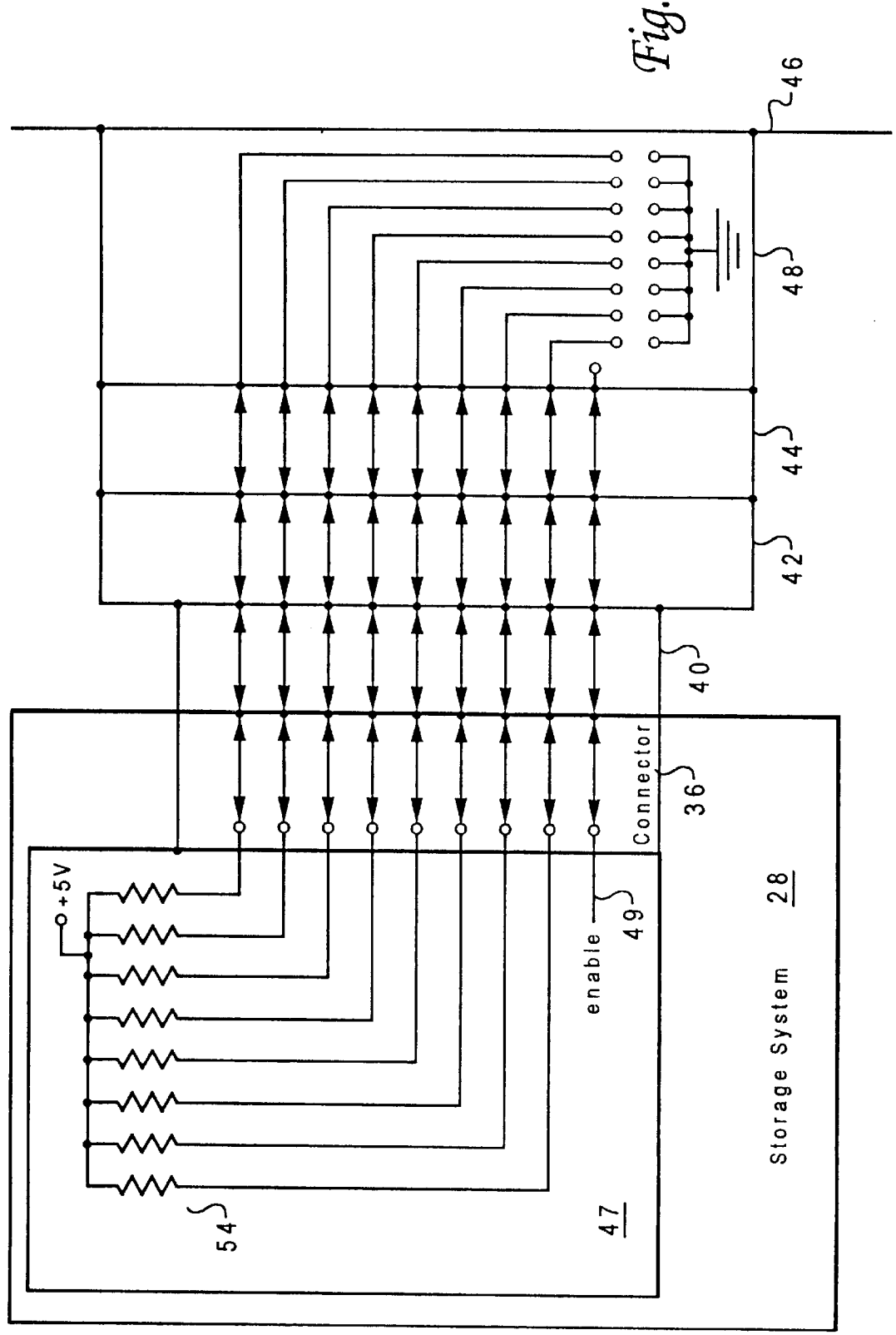
FIG. 3 depicts a schematic diagram of circuit card 47 and circuit 48 communicating with connectors 36 and 44, respectively, and tray connector 42 in data-processing system 10 in accordance with the present invention.

FIG. 3 is a schematic diagram of circuit card 47 and circuit 48 communicating with connectors 36 and 44, respectively, and tray connector 42 in a data-processing system in accordance with the present invention. Circuit card 47 includes a plurality of resistors 54. Plurality of resistors 54 may be utilized to specify a particular digital value which may be used to indicate a particular physical location, or address, for the storage system communicating with circuit 48.

A different circuit will communicate with each backplane connector. Selected resistors may be grounded or pulled up to a supply voltage level in order to select a particular digital physical address. A different physical address may be selected utilizing the circuit communicating with each backplane connector. In this manner, the storage system coupled to each backplane interface will be associated with a unique physical address. The physical address may be stored in the storage system having that physical address. In addition, operating parameters included fan faults, power faults, or other information may also be stored within the storage system's RAM. Data-processing system 10 may access the RAM by decoding the state of the enable signal 49 for each storage system to determine its unique physical address or operating parameters.

Figure 4:
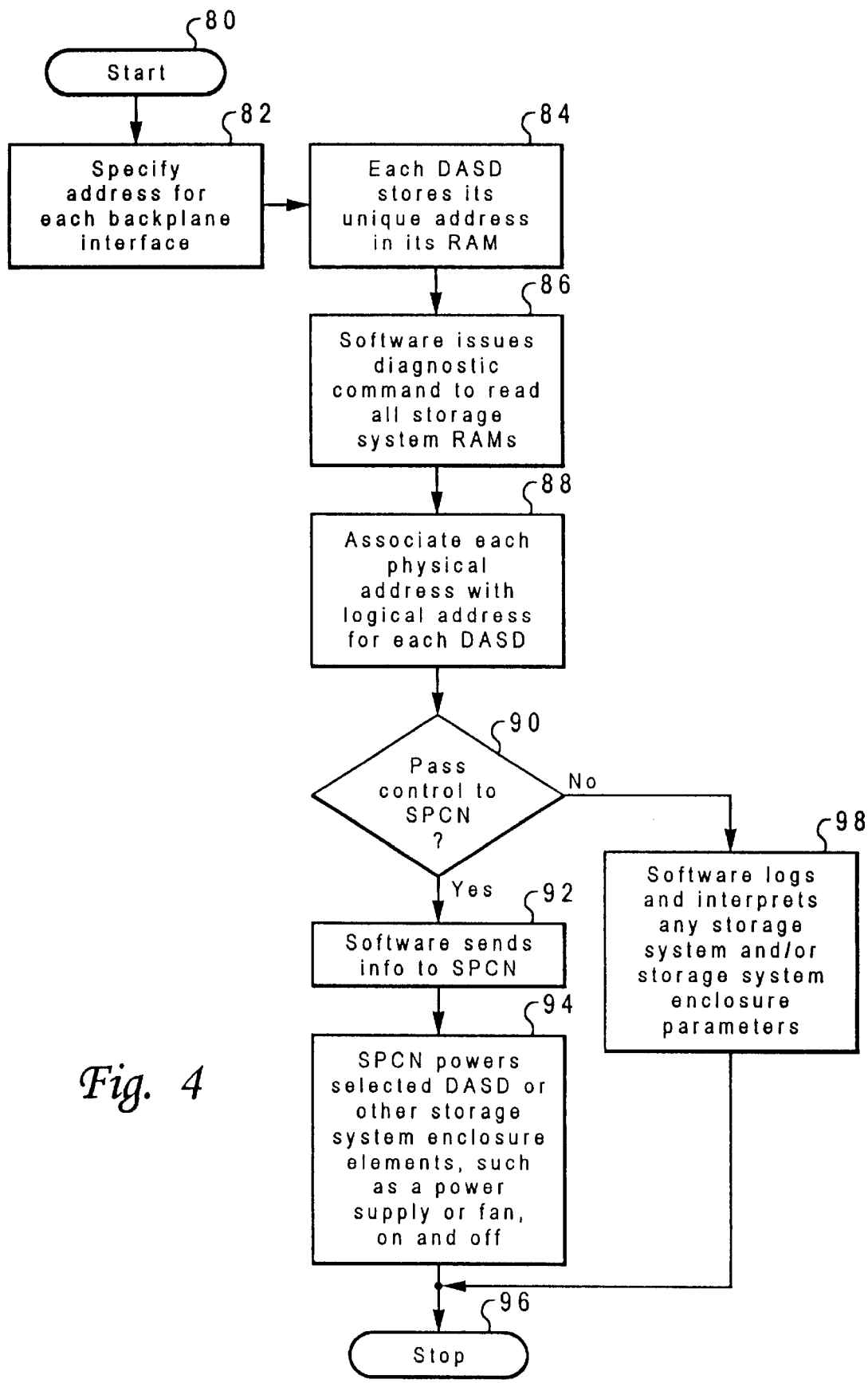
FIG. 4 illustrates a high-level flow chart depicting the determination of operating parameters for each storage system included within storage system enclosure 26 in data-processing system 10 in accordance with the present invention.

FIG. 4 is a high-level flow chart depicting the determination of operating parameters which includes a physical address for each storage system included within a storage system enclosure in a data-processing system in accordance with the present invention. The process starts as depicted at block 80 and thereafter passes to block 82 which illustrates the selection of a physical address for each storage system coupled to the backplane connector by grounding the appropriate ones of plurality of resistors 54. Preferably, a different address is selected for each backplane connector.

Next, block 84 depicts each storage system storing its physical address in its RAM. In addition, other information may be stored in the RAM which may be accessed by data-processing system 10. For example, the other information may include information regarding a power fault, a fan fault, or other information regarding the particular storage system or storage system enclosure. Block 86 illustrates data-processing system 10 issuing a diagnostic command in order to read the RAM for all of the storage systems included within the storage system enclosure.

Thereafter, block 88 depicts the association of the physical address with the logical address, which is used by software, for each storage system. Block 90, then, illustrates a determination of whether or not software is to pass control of the storage system enclosure to the SPCN. If a determination is made that software is to pass control to the SPCN, the process passes to block 92 which depicts data-processing system 10 transmitting this information to the system power control network (SPCN). Next, block 94 depicts the SPCN utilizing the physical address to turn particular storage systems or other enclosure elements, such as a power supply or a fan, on and off. The process, then terminates as depicted at block 96. Referring again to block 90, if a determination is, made that software is not to pass control to the SPCN, the process passes to block 98 which depicts the software logging and interpreting any storage system and/or storage system enclosure parameters. The process then terminates as depicted at block 96.

While an illustrative embodiment has been particularly shown and described, it will be understood by those skilled in the art that various changes in form and detail may be made therein without departing from the spirit and scope of the illustrative embodiment.

I claim:

1. An interface in a data processing system for identifying operating parameters including a physical location of a storage system coupled to a storage system enclosure having a backplane, wherein said data processing system communicates with said storage system utilizing a serial bus, comprising:

said backplane including a plurality of backplane interfaces, each of said plurality of backplane interfaces being associated with a different physical location, and each of said plurality of backplane interfaces including a circuit coupled to a backplane connector, said backplane connector for coupling said backplane interface to one of a plurality of storage systems;

one of said plurality of storage systems being coupled to one of said plurality of backplane interfaces, each of said plurality of storage system having a first connector and a second connector, said first-connector being coupled to a resistor circuit, and said first and second connectors being coupled to a backplane connector included within one of said plurality of backplane interfaces, said resistor circuit being coupled to said backplane circuit for specifying a physical address for said one of said plurality of storage systems;

said first connector being utilized only for specifying said physical location associated with said one of said plurality of backplane interfaces, and said second connector being separate from said first connector and being utilized only for transmission of data;

a plurality of resistors included within said resistor circuit; and said one of said plurality of backplane interfaces including said circuit for connecting selected ones of said plurality of resistors to a first potential and all remaining said plurality of resistors to a second potential to identify said operating parameters including a physical location of said one of said plurality of storage systems coupled to said one of said plurality of backplane interfaces.

2. The interface according to claim 1 wherein said serial bus conforms to a small computer system interface standard for serial communication.

3. The interface according to claim 2 wherein each said plurality of storage systems includes a memory for storing said operating parameters including a physical location of each of said plurality of storage systems, wherein said memory may be accessed by said data processing system to read said stored parameters.

4. The interface according to claim 1 further including means for enabling said data processing system to access a memory included within each of said plurality of storage systems.

5. The interface according to claim 4 wherein each of said plurality of storage systems includes a first circuit card coupled to said first connector, said plurality of resistors being included on said first circuit card.

6. The interface according to claim 1 wherein said operating parameters include a status of a power supply included within said storage system enclosure.

7. The interface according to claim 1 wherein said operating parameters include a status of a fan included within said storage system enclosure.

8. A method in a data processing system for determining operating parameters including a physical location of a storage system coupled to a storage system enclosure having a backplane, wherein said data processing system communicates with said storage system utilizing a serial bus, said method comprising the steps of:

coupling said storage system to said storage system enclosure utilizing a backplane interface included within said backplane and a second connector included with said storage system, said second connector being utilized only for transmission of data;

In response to said coupling, specifying a physical address utilizing a circuit included within said backplane interface by connecting at least one of a plurality of resistors to a first potential and all remaining said plurality of resistors to a second potential, said plurality of resistors included within said storage system and being coupled to a first connector included within said storage system said first connector being separate from said second connector and being utilized only for specifying a physical address; and determining said operating parameters including said physical address specified for said storage system by accessing said plurality of resistors utilizing said first connector and said backplane interface.

9. The method according to claim 8 wherein said data processing system communicates with said storage system utilizing a small computer system interface standard for serial communication.

10. The method according to claim 9 wherein said storage system includes a memory for storing said operating parameters including said physical location, further comprising the step of accessing said memory to read said operating parameters.

11. The method according to claim 10, further comprising the steps of:

determining a logical address for said storage system, wherein said logical address is utilized by software executing within said data-processing system to identify said storage system; and associating said logical address with said physical address, wherein said software accesses said storage system utilizing said physical address.

12. The method according to claim 8 further comprising the step of determining said operating parameters including a status of a power supply included within said storage system enclosure by accessing said plurality of resistors utilizing said first connector and said backplane interface.

13. The method according to claim 8 further comprising the step of determining said operating parameters including a status of a fan included within said storage system enclosure by accessing said plurality of resistors utilizing said first connector and said backplane interface.

* * * * *